United States Patent
Kataoka et al.

(10) Patent No.: US 8,480,492 B2
(45) Date of Patent: Jul. 9, 2013

(54) GAME DEVICE, GAME CONTROL METHOD, AND GAME CONTROL PROGRAM FOR CONTROLLING GAME IN WHICH PLAYER'S CHARACTER LOCATED IN GAME FIELD IS MANIPULATED

(75) Inventors: Yohei Kataoka, Tokyo (JP); Masaaki Yamagiwa, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 13/213,862

(22) Filed: Aug. 19, 2011

(65) Prior Publication Data
US 2012/0052950 A1 Mar. 1, 2012

(30) Foreign Application Priority Data

Aug. 31, 2010 (JP) ................................. 2010-194435
May 18, 2011 (JP) ................................. 2011-111613

(51) Int. Cl.
*A63F 13/06* (2006.01)

(52) U.S. Cl.
USPC .................................. 463/37; 463/1; 463/36

(58) Field of Classification Search
USPC ........................................ 463/7, 9, 31, 37, 42
See application file for complete search history.

(56) References Cited

U.S. PATENT DOCUMENTS

2004/0143852 A1* 7/2004 Meyers ........................... 725/133
2008/0207331 A1* 8/2008 Beale .............................. 463/42
2009/0098919 A1* 4/2009 Yuji et al. .......................... 463/9
2009/0247300 A1* 10/2009 Suzuki et al. .................... 463/37
2009/0305758 A1* 12/2009 Nomura ........................... 463/7
2010/0029382 A1* 2/2010 Cao .................................. 463/31

OTHER PUBLICATIONS

Womble007, Alone No Longer: A Summoner Necromancer Guide Diablo II, Sep. 8, 2008, http://www.neoseeker.com/forums/726/t1230594-alone-no-longer-summoner-necromancer-guide/.*
Mass Effect Wiki, Dossier: Archangel, Feb. 9, 2010, http://masseffect.wikia.com/wiki/Dossier:_Archangel.*
Maxfreak, Diablo II NPCs, Aug. 8, 2007, http://www.maxfreak.com/diablo2/npcs.shtml.*
Planet Diablo, Quests, Oct. 11, 2008, http://www.planetdiablo.com/diablo/quests/.*
Blizzard, Diablo II Manual, 2005.*

* cited by examiner

*Primary Examiner* — Dmitry Suhol
*Assistant Examiner* — Jason Yen
(74) *Attorney, Agent, or Firm* — Matthew B. Dernier, Esq.; Gibson & Dernier LLP (57) ABSTRACT

A game device includes: a character control unit configured to move a player's character in a game field in accordance with a control command from a player; a group control unit configured to move a character belonging to a group including the player's character along with the player's character; and an enemy character control unit configured to move an enemy character located in the game field so as to follow the player's character or a character belonging to the group. The group control unit includes a function of causing at least one of the characters belonging to the group to leave the group. The enemy character control unit includes a function of allowing the enemy character to attack the player's character or the character that left the group when the enemy character catches up with the player's character or the character that left the group.

7 Claims, 8 Drawing Sheets

GAME DEVICE, GAME CONTROL METHOD, AND GAME CONTROL PROGRAM FOR CONTROLLING GAME IN WHICH PLAYER'S CHARACTER LOCATED IN GAME FIELD IS MANIPULATED

BACKGROUND OF THE INVENTION

1. Field of the Invention

The present invention relates to a game control technology and, more particularly, to a game device, game control method, and a game control program configured to control a game in which the player manipulates a player's character located in a game field so as to achieve an intended purpose.

2. Description of the Related Art

A large number of games are provided in which the player manipulates a player's character located in a game field so as to achieve an intended purpose by acquiring an item or fighting with an enemy character. Some games are designed such that the player's character joins characters located in the game field to form a group and cooperate with each other to achieve an intended purpose.

[patent document No. 1] Published U.S. Patent Application 2009/0247300

We have invented a technology adapted for games in which the player's character forms a group with other characters so as to achieve an intended purpose and configured to provide improved entertainment value.

SUMMARY OF THE INVENTION

The present invention has been developed in the background of the above-described situation and a purpose thereof is to provide a game control technology capable of providing increased entertainment value.

One embodiment of the present invention relates to a game control program. The game control program comprises: a module configured to move a player's character in a game field in accordance with a control command from a player; a module configured to move a character belonging to a group including the player's character along with the player's character; a module configured to move an enemy character located in the game field so as to follow the player's character or a character belonging to the group; a module configured to cause at least one of the characters belonging to the group to leave the group; and a module configured to allow the enemy character to attack the player's character or the character that left the group when the enemy character catches up with the player's character or the character that left the group.

Optional combinations of the aforementioned constituting elements, and implementations of the invention in the form of methods, apparatuses, and systems may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention The game device according to the embodiment provides a game in which the player manipulates a character of a grass-eating animal (hereinafter, referred to as the player's character) to survive in a game field by eating grass, cooperating with fellow characters to escape from a character of a meat-eating animal (hereinafter, referred to as "enemy character") that preys upon grass-eating animals. The player's character can form a group by coming into contact with another character of a grass-eating animal found in the game field and inviting the character.

The game device according to the embodiment provides the function of causing some of the characters belonging to a group to leave the group when the group encounters an enemy character so as to use the characters that left the group as decoys, and allowing the group to escape from the enemy character while the enemy character is attacking the decoys. The enemy character targets a decoy character that falls down and does not chase the group including the player's character until the enemy character finishes eating the decoy character. If a predetermined period of time elapses without a decoy character being eaten by the enemy character, the decoy character can return to the group.

Figure 1:
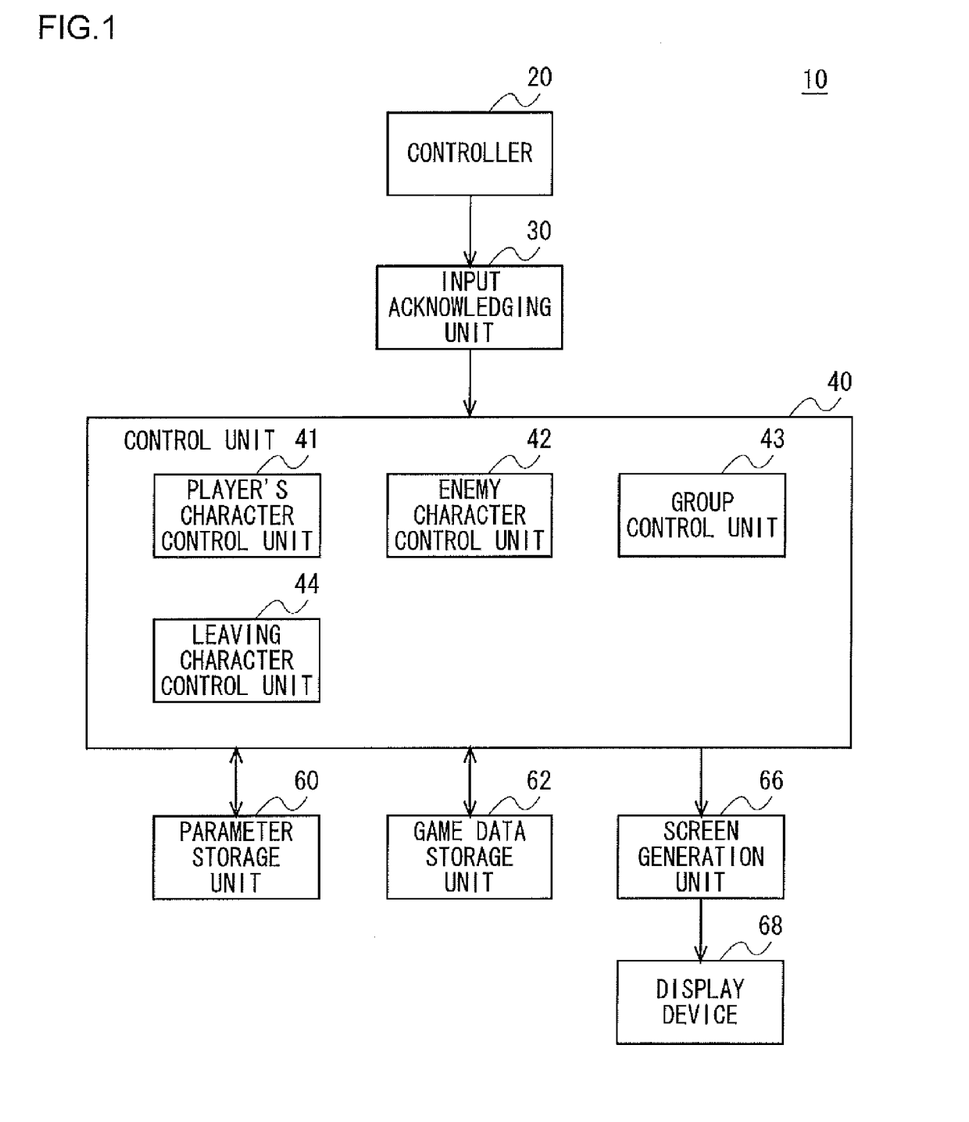
FIG. 1 shows the configuration of a game device 10 according to the embodiment.

FIG. 1 shows the configuration of a game device 10 according to the embodiment. The game device 10 is provided with a controller 20, an input acknowledging unit 30, a control unit 40, a parameter storage unit 60, a game data storage unit 62, a screen generating unit 66, and a display device 68. The components may be implemented by hardware components such as a CPU of an arbitrary computer, a memory, or a program loaded into the memory. FIG. 1 depicts functional blocks implemented by the coordination of these components. Therefore, it will be obvious to those skilled in the art that the functional blocks may be implemented in a variety of manners by hardware only, software only, or a combination of thereof.

The input acknowledging unit 322 acknowledges a control signal from the controller 20 controlled by the player. The control unit 40 advances the game based on a control command from the player acknowledged by the input acknowledging unit 30. The parameter storage unit 60 stores various parameters necessary to advance the game. The game data storage unit 62 stores a game program, three-dimensional data forming a game field, data for characters, etc. The screen generation unit 66 generates a game screen controlled by the control unit 40 and causes the display device 68 to display the screen.

The control unit 40 includes a player's character control unit 41, an enemy character control unit 42, a group control unit 43, and a leaving character control unit 44.

When the game is started, the control unit 40 reads the data for the game field from the game data storage unit 62 and causes the screen generation unit 66 to generate an initial screen of the game. Enemy characters and items located in the game field may be stored in the game data storage unit 62 in advance. Alternatively, the control unit 40 may generate enemy characters and items in accordance with a predetermined condition when the game is started. The control unit 40 measures the time elapsed since the start of the game and records the time in the parameter storage unit 60. When the game is over, the control unit 40 counts a score depending on the elapsed time and presents the score to the player as a game record.

The player's character control unit 41 controls the player's character in accordance with the player's control command provided by using the controller 20 and acknowledged by the input acknowledging unit 30. When the player's character control unit 41 acknowledges an input via a direction key, the player's character control unit 41 moves the player's character in the designated direction.

The player's character control unit 41 manages a life point indicating the life power of the player's character and records the life point in the parameter storage unit 60. The player's character control unit 41 reduces the life point by a predetermined amount in association with the movement of the player's character, elapsed time, attacks from enemy characters, etc. When the player's character comes into contact with a plant located in the game field, the player's character control unit 41 displays a screen showing the player's character eating the plant and increases the life point by a predetermined amount. When the life point of the player's character reaches 0, the game is over. The player's character control unit 41 reduces the maximum value of the life point in accordance with the time elapsed since the start of the game. The player's character control unit 41 also ensures that the longer the elapsed time, the higher the speed of reducing the life point. In other words, as the player's character grows old, it becomes more difficult for the character to survive.

As described later, the player's character coming into contact with a meat-eating enemy character is eaten by the enemy character so that the life point becomes 0. When there are ally characters belonging to the group of the player's character, the player's character control unit 41 selects one of the surviving ally characters and turns the selected character into the player's character. The player's character control unit 41 may set the life point of the new player's character to the maximum value or to a predetermined level lower than the maximum value.

The enemy character control unit 42 controls a character located in the game field as an enemy to the player's character. The enemy character control unit 42 controls the behavior of each of the enemy characters located in the game field using artificial intelligence, updates the current position, and stores the updated position in the parameter storage unit 60. When the player's character is not located around the enemy character, the enemy character control unit 42 moves the enemy character in a random fashion. The enemy character control unit 42 determines whether the enemy character finds the player's character or an ally character belonging to the group of the player's character according to a predetermined timing schedule. For example, the enemy character control unit 42 determines that the enemy character finds the player's character or the ally character when the player's character or the ally character is located within the first range from the current position of the enemy character. The first range may be more extensive in the forward direction of movement of the enemy character than in the rear direction. The first range may be set in accordance with the type of enemy character. When the enemy character control unit 42 determines that the enemy character finds the player's character or the ally character, the enemy character control unit 42 moves the enemy character to chase the player's character.

When the enemy character enters the second range from the player's character or the ally character, the enemy character control unit 42 shows the enemy character attacking and eating the player's character or the ally character. The enemy character control unit 42 does not move the enemy character while the enemy character is eating the player's character or the ally character. Therefore, the player's character can continue to escape from the enemy when the ally character is eaten. If there are no ally characters when the player's character is eaten, the game is over. If an ally character is still found, the surviving ally character can be turned into the player's character, which can continue to escape from the enemy. When a predetermined period of time has elapsed since the enemy character catches up with the ally character, the enemy character control unit 42 causes the enemy character to finish eating the ally character and determines whether the enemy character finds the player's character or an ally character belonging to the group of the player's character. If the group of the player's character is outside the first range from the enemy character at that time, the player's character is successful in escaping from the enemy character. When the enemy character finishes eating the decoy ally character, the enemy character control unit 42 may cause the enemy character to target the player's character again and to chase the player's character.

When an ally character leaves the group of the player's character, the enemy character control unit 42 causes the enemy character to target the character that left the group in preference to the other characters. Accordingly, the player's character can increase the chance of success of escape by causing an ally character to leave the group as a decoy when the player's character is being chased by the enemy character so that the player's character is no longer targeted by the enemy character. The enemy character control unit 42 may cause a plurality of enemy characters to target different types of characters. Even in this case, an ally character leaving the group of the player's character may be set to be a target of attack from all enemy characters. This minimizes the damages to the ally characters incurred when the player's character is being chased by a plurality of enemy characters by causing the plurality of enemy characters to target a single ally character.

When the player's character comes into contact with an ally character located in the game field, the group control unit 43 causes the ally character to belong to the group of the player's character. As described above, so long as there is any ally character belonging to the group, the game can be continued even when the player's character is eaten by the enemy character. The group control unit 43 moves the ally characters belonging to the group to follow the player's character. Ally characters not belonging to the group may be moved in the game field in a random fashion or under control of artificial intelligence, or remain stationary where the character is initially located.

When the group control unit 43 acknowledges a control command from the player via the input device requesting that an ally character belonging to the group of the player's character leave the group, the group control unit 43 cause the ally character belonging to the group to leave the group. When a plurality of ally characters belong to the group, the group control unit 43 may cause one ally character to leave the group or cause a plurality of ally characters to leave the group. Of the ally characters belonging to the group, the group control unit 43 may cause the ally character at the end of the group to leave the group.

The leaving character control unit 44 controls the ally character that left the group. The leaving character control unit 44 causes the ally character that left the group to fall down where the character is and remain stationary, pretending that the character is dead. This will turn the ally character belonging to the group into a decoy, creating an opportunity for the player's character and the other ally characters to escape from the enemy character while the enemy character is being attracted by the decoy. All of the enemy characters may target the decoy even when the player's character is being chased by a plurality of enemy characters.

The leaving character control unit 44 may cause the ally character that left the group to escape from the enemy character under control of artificial intelligence. In this case, the ally character may be caused to escape in a direction different from the group of the player's character because the escape of an ally character as an alloy will lose its worth if the ally character that left the group escapes in the same direction as the group of the player's character.

The leaving character control unit 44 may move the ally character that left the group in the neighborhood of the position of leaving under control of artificial intelligence. In this case, the leaving character control unit 44 may move the ally character that left the group in a random fashion. Alternatively, the leaving character control unit 44 may move the ally character that left the group under control of artificial intelligence such that the character does not leave a predefined range from the position of leaving.

When the player manipulates the player's character after an ally character left the group, moving the player's character to come into contact with the ally character that left the group, the group control unit 43 returns the ally character that left the group to the group of the player's character again.

If an ally character survives without being eaten by the enemy character (e.g., for the reason that the enemy character did not find the ally character) when a predetermined time has elapsed since the group control unit 43 caused the ally character to leave the group, the leaving character control unit 44 may move the ally character to chase the player's character to return to the group of the player's character. When the alloy character that left the group catches up with the group of the player's character, the group control unit 43 returns the ally character to the group of the player's character.

Figure 2:
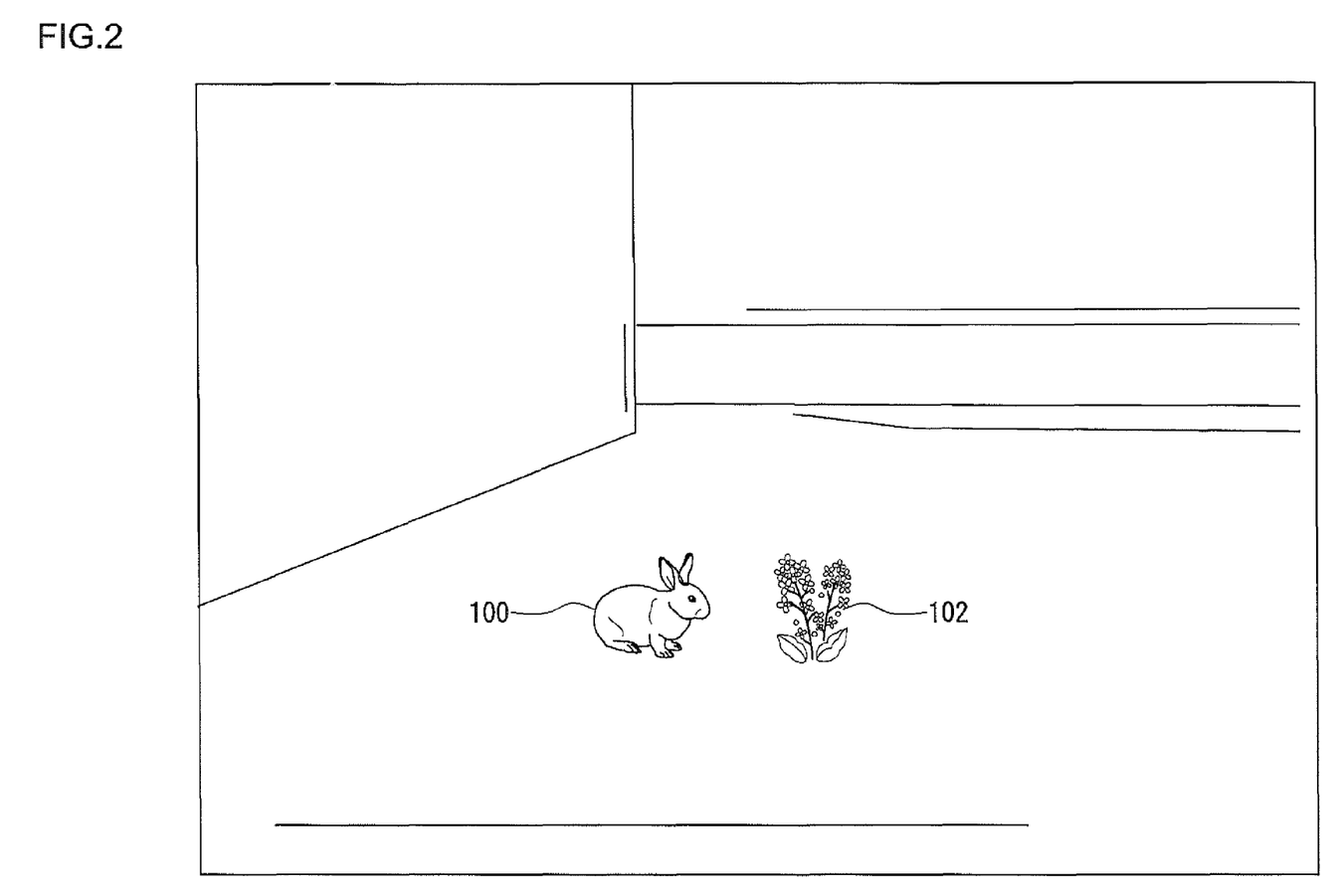
FIG. 2 shows an example of a screen of a game controlled by the game device according to the embodiment.

FIG. 2 shows an example of a screen of a game controlled by the game device according to the embodiment. The screen shows a player's character 100 and plant 102, which is an item that the player's character may eat. As the player controls the player's character to move the character close to the plant 102, the player's character control unit 41 displays the player's character 100 eating the plant 102 and increases the life point accordingly.

Figure 3:
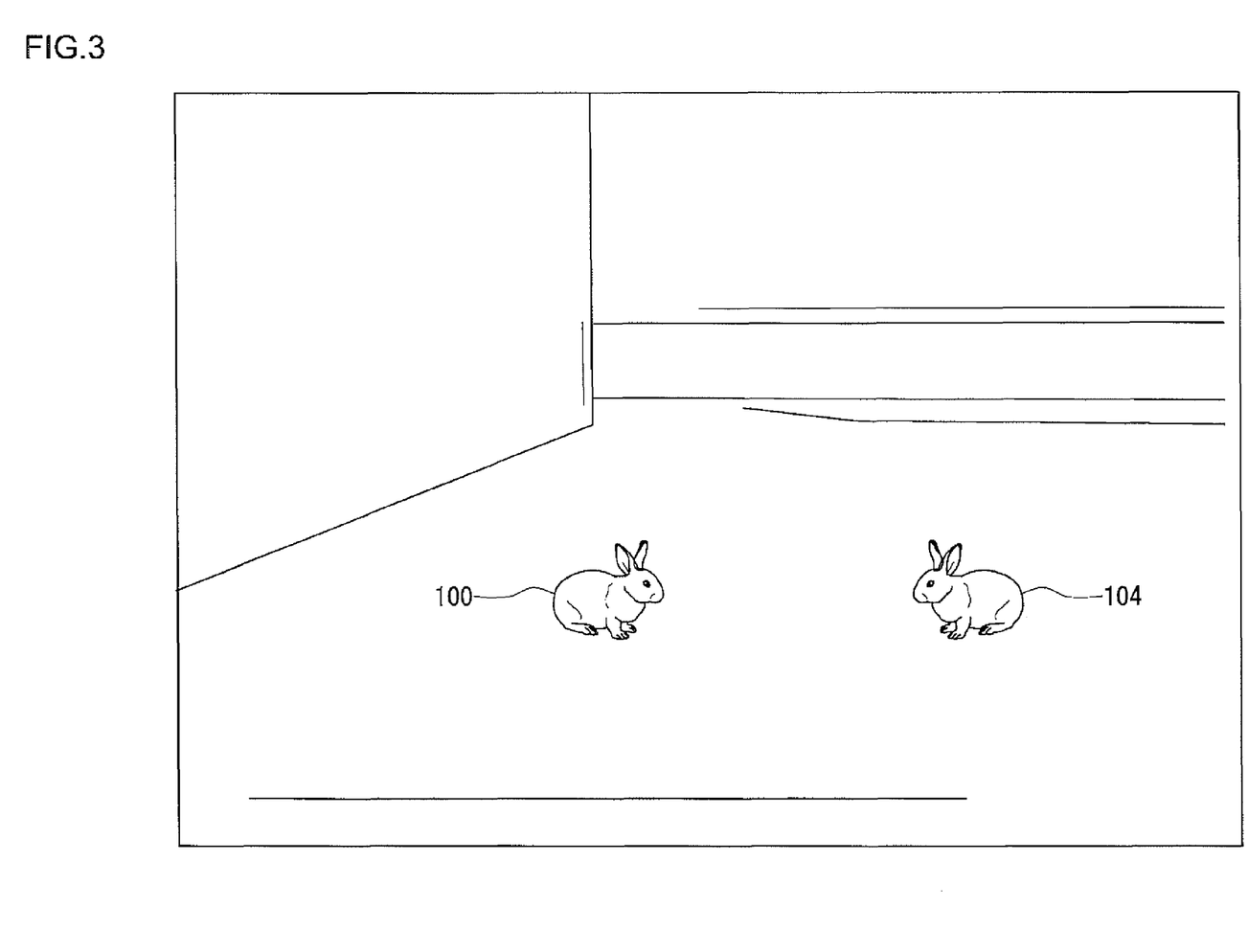
FIG. 3 shows an example of a screen of a game controlled by the game device according to the embodiment.

FIG. 3 shows an example of a screen of a game controlled by the game device according to the embodiment. The screen shows the player's character 100 and an ally character 104 which is an ally of the player's character. As the player controls the player's character to move the character close to the ally character 104, the group control unit 43 causes the ally character 104 to belong to the group of the player's character 100.

Figure 4:
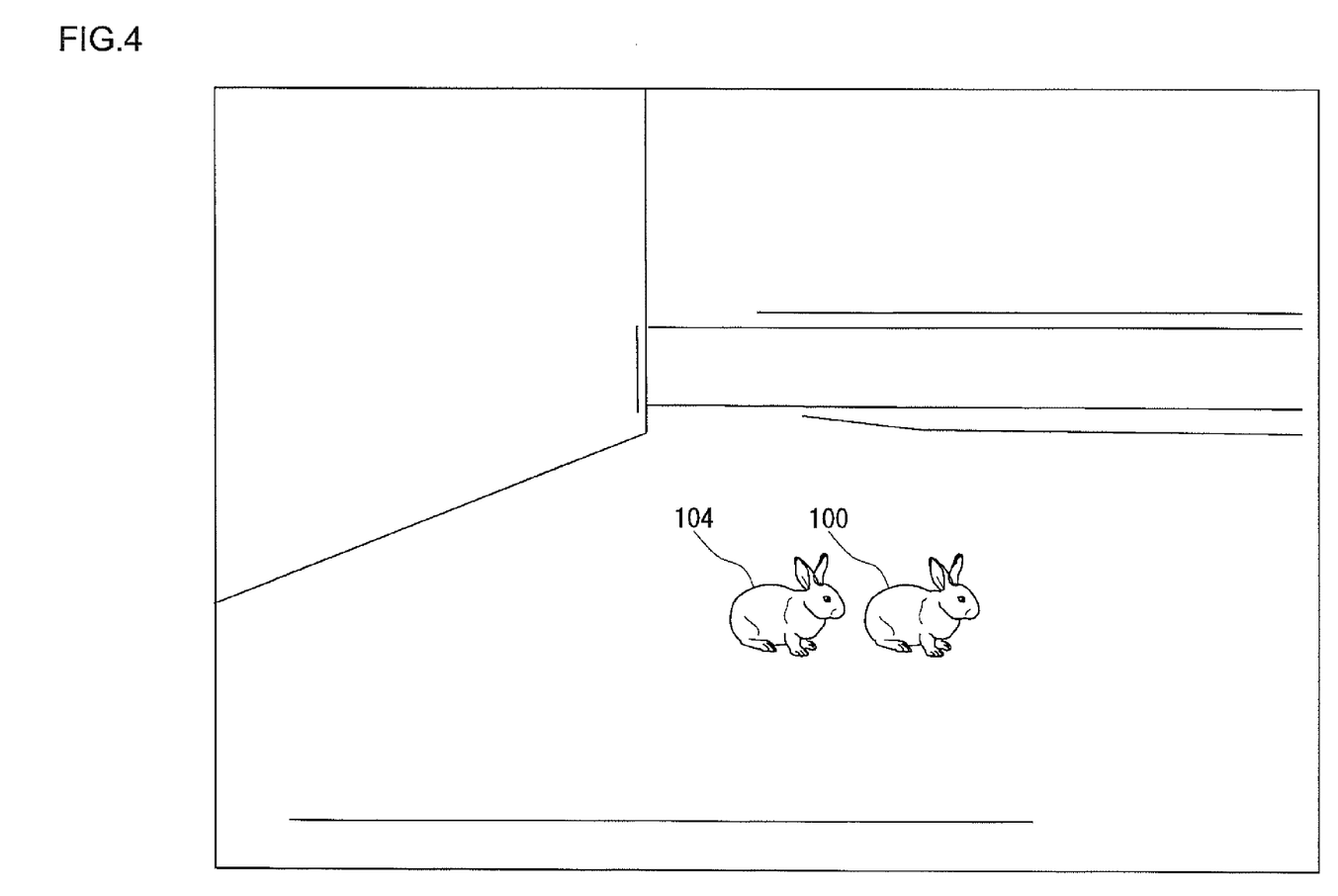
FIG. 4 shows an example of a screen of a game controlled by the game device according to the embodiment.

FIG. 4 shows an example of a screen of a game controlled by the game device according to the embodiment. The group control unit 43 moves the alloy character 104 belonging to the group to follow the player's character.

Figure 5:
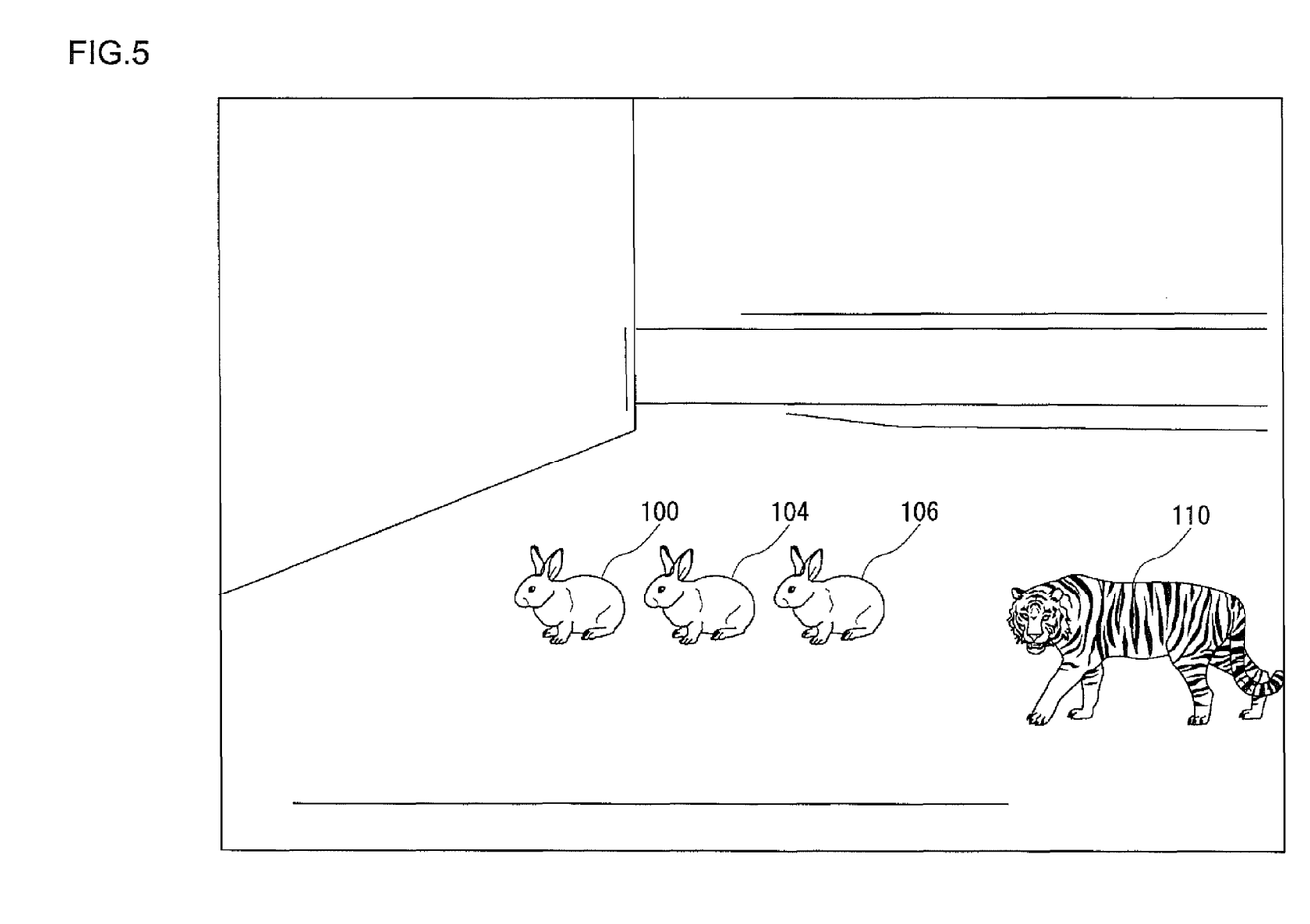
FIG. 5 shows an example of a screen of a game controlled by the game device according to the embodiment.

FIG. 5 shows an example of a screen of a game controlled by the game device according to the embodiment. The screen shows the player's character 100, ally characters 104 and 106 belonging to the group of the player's character, and an enemy character 110. When the enemy character control unit 42 determines that the enemy character finds the player's character 100, the enemy character control unit 42 sets the player's character 100 as a target and moves the enemy character 110 to chase the player's character 100.

Figure 6:
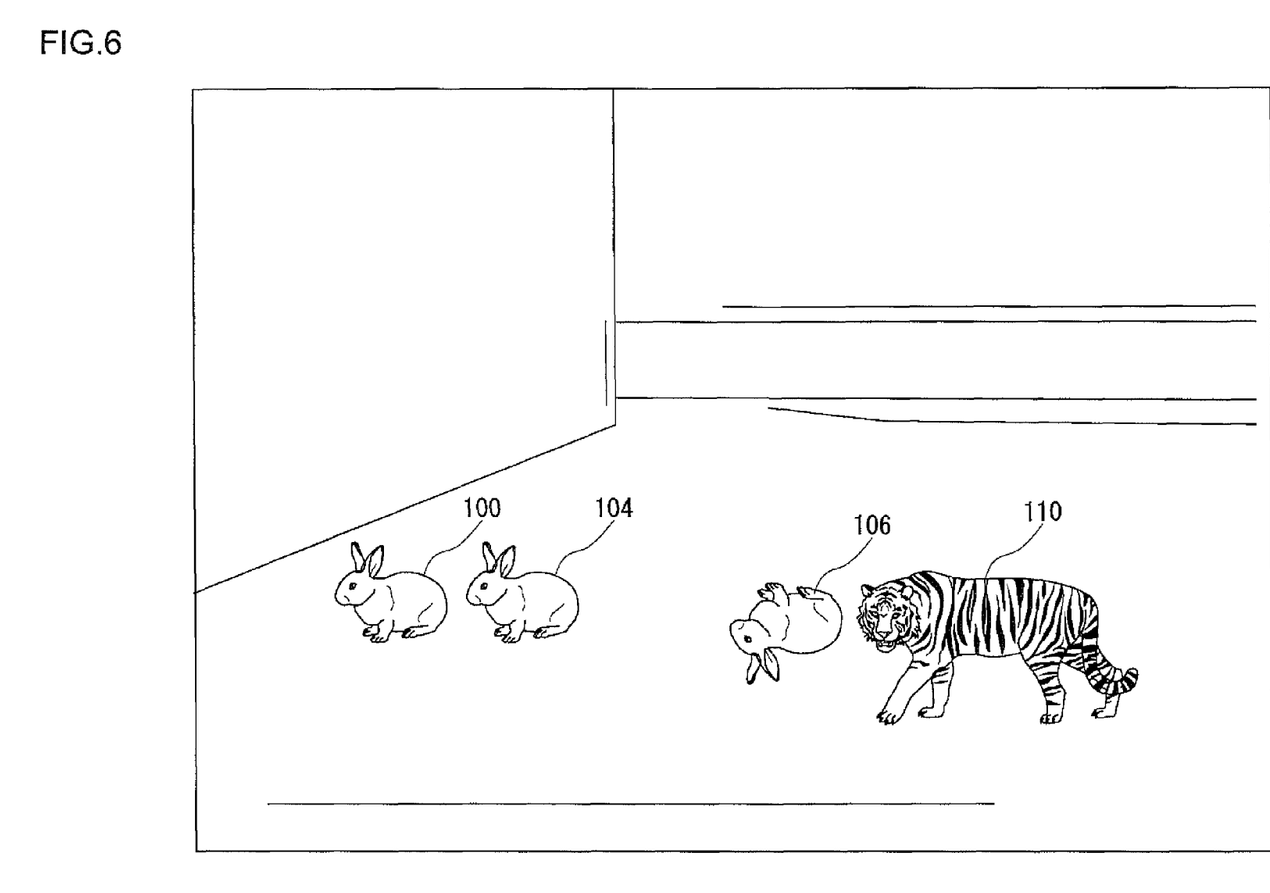
FIG. 6 shows an example of a screen of a game controlled by the game device according to the embodiment.

FIG. 6 shows an example of a screen of a game controlled by the game device according to the embodiment. When the player enters a control command to cause an ally character belonging to the group to leave the group as a decoy, the group control unit 43 cause the ally character 106 to leave the group and pretend that the character is dead. The enemy character control unit 42 sets the ally character 106 as a target and, when the enemy character 110 catches up with the ally character 106, displays the enemy character 110 eating the ally character 106.

Figure 7:
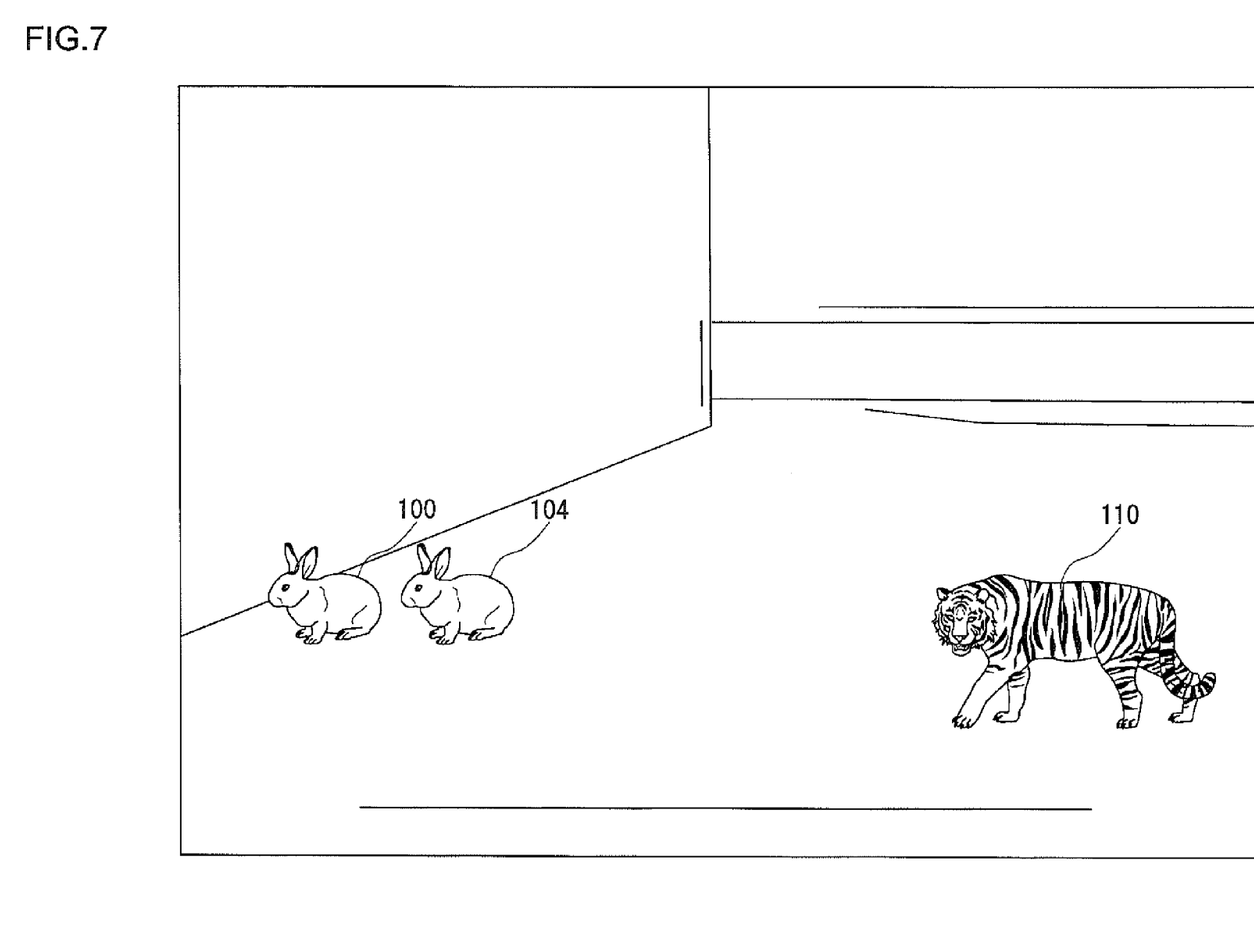
FIG. 7 shows an example of a screen of a game controlled by the game device according to the embodiment.

FIG. 7 shows an example of a screen of a game controlled by the game device according to the embodiment. While the enemy character 110 is eating the ally character 106, the player can control the player's character 100 to cause the player's character to escape from the enemy character 110. This allows the player's character 100 and the ally character 104 to evade the attack from the enemy character 110 and to survive.

Figure 8:
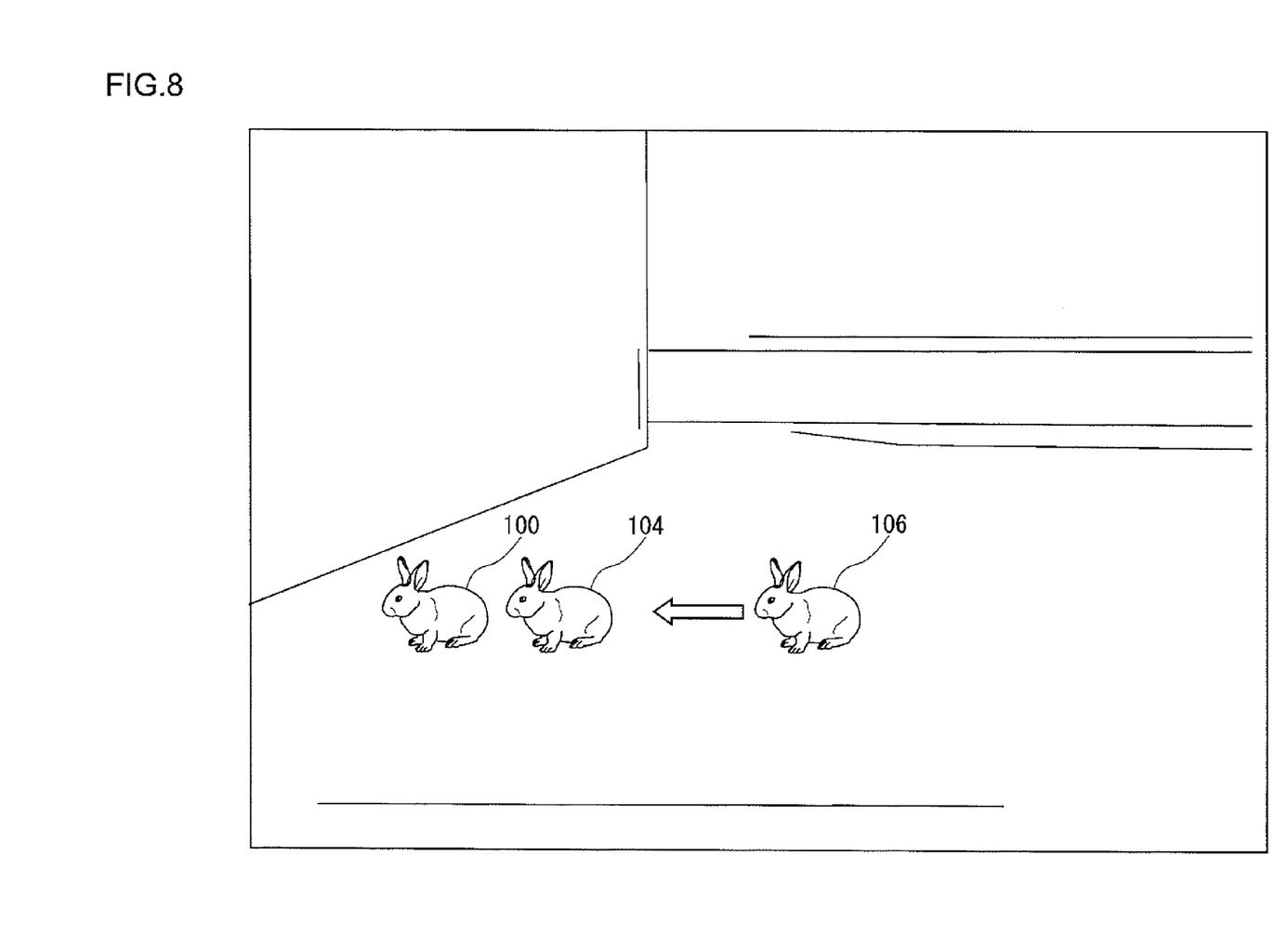
FIG. 8 shows an example of a screen of a game controlled by the game device according to the embodiment.

FIG. 8 shows an example of a screen of a game controlled by the game device according to the embodiment. If the ally character 106 survives without being eaten by the enemy character 110 when a predetermined time has elapsed since the group control unit 43 caused the ally character 106 to leave the group, the leaving character control unit 44 moves the ally character 106 toward the group of the player's character 100 so as to return the ally character 106 to the group.

Described above is an explanation based on an exemplary embodiment. The embodiment is intended to be illustrative only and it will be obvious to those skilled in the art that various modifications to constituting elements and processes could be developed and that such modifications are also within the scope of the present invention.

When the player enters a control command to cause an ally character belonging to the group to leave the group, the group control unit 43 may determine whether or not to cause the ally character to leave the group. For example, the player's character control unit 41 may manage a score indicating the leadership of the player's character in the group so that, when the score is higher than a predetermined value, the ally character may be caused to leave the group in accordance with the command and, when the score is low, the ally character is prevented from leaving the group. When the score is lower than the predetermined value, the ally character belonging to the group may act on its own according to artificial intelligence or leave the group instead of following the player's character.

A plurality of types of enemy characters and ally characters may be located in the game field so that the moving speed, strength of attach, strength of defense, predator-prey relationship, etc. may be defined for each type.

In this case, the player may have an option of selecting which of the ally characters belonging to the group is caused to leave the group as a decoy. This will add the enjoyment of selecting a more useful ally character as a decoy depending on the type of chasing enemy character and causing the selected character to leave the group accordingly.

In the embodiment, the enemy character control unit 42 causes the ally character leaving the group of the player's character to be attacked in preference to the player's character. In an alternative embodiment, the player's character or the ally character, whichever is closer to the enemy character, may be the target of attack. The ally character that left the group had moved so as to follow the player's character and so is normally closer to the enemy character than the player's character. Therefore, regardless of whether the ally character that left the group is caused to remain stationary where the character is or the ally character is caused to escape independently of the group of the player's character, the enemy character will catch up with the ally character that left the group before the enemy character caches up with the player's character. Therefore, the group including the player's character can continue to escape from enemy while the enemy character is attacking the ally character that left the group.

As regards the first range used for determination as to whether the enemy character finds the player's character or the ally character belonging to the group of the player's character, the enemy character control unit 43 may define the first range for the ally character that left the group to be more extensive than the first range for the player's character. In this case, when the enemy character is located at a position outside the first range defined for the player's character and within the first range defined for the ally character that left the group, it is ensured that the ally character that left the group is selected as a target of attack from the enemy character before the player's character is found by the enemy character. Accordingly, the group including the player's character can continue to escape from the enemy while the enemy character is chasing the ally character that left the group.

What is claimed is:

1. A game control program embedded on a non-transitory computer-readable recording medium, comprising:
   a module configured to move a player character in a game field in accordance with a control command from a player;
   a module configured to move a character belonging to a group, which includes the player character, along with the player character;
   a module configured to move an enemy character located in the game field so as to follow the player character or the character belonging to the group;
   a group control module configured to cause at least one of the characters belonging to the group to leave the group;
   a target control module configured to change a target of attack by the enemy character, from the player character or the character belonging to the group to the character that left the group, when at least one of the characters belonging to the group is caused to leave the group by the group control module;
   a module configured to allow the enemy character to attack the player character or the character that left the group when the enemy character catches up with the player character or the character that left the group; and
   a module configured to return the character that left the group to the group when a predetermined time has elapsed since the character left the group without the character being attacked by the enemy character.

2. The game control program according to claim 1, further comprising: a module configured to cause another character located in the game field to join the group.

3. The game control program according to claim 1, wherein the target control module ensures that the character that left the group is no longer attacked by the enemy character when a predetermined period of time has elapsed since the target control module changed a target of attack by the enemy character to the character that left the group.

4. The game control program according to claim 1, further comprising: a module configured to cause another character located in the game field to join the group.

5. The game control program according to claim 1, wherein the target control module ensures that the character that left the group is no longer attacked by the enemy character when a predetermined period of time has elapsed since the target control module changed a target of attack by the enemy character to the character that left the group.

6. A game device, comprising:
   a character control unit configured to move a player character in a game field in accordance with a control command from a player;
   a group control unit including a processor configured to move a character belonging to a group, which includes the player character, along with the player character; and
   an enemy character control unit configured to move an enemy character located in the game field so as to follow the player character or the character belonging to the group,
   wherein the group control unit includes a function of causing at least one of the characters belonging to the group to leave the group,
   wherein the enemy character control unit changes a target of attack by the enemy character, from the player character or the character belonging to the group to the character that left the group, when at least one of the characters belonging to the group is caused to leave the group by the group control unit,
   wherein the enemy character control unit includes a function of allowing the enemy character to attack the player character or the character that left the group when the enemy character catches up with the player character or the character that left the group, and
   wherein the group control unit returns the character that left the group to the group when a predetermined time has elapsed since the character left the group without the character being attacked by the enemy character.

7. A game control method executed by a game device, the method comprising:
   moving a player character in a game field displayed on a display device in accordance with a control command inputted by a player via an input device;
   moving a character belonging to a group, which includes the player character, along with the player character;
   moving an enemy character located in the game field displayed on the display device so as to follow the player character or the character belonging to the group;
   causing at least one of the characters belonging to the group to leave the group;
   changing a target of attack by the enemy character, from the player character or the character belonging to the group to the character that left the group, when at least one of the characters belonging to the group is caused to leave the group,
   allowing the enemy character to attack the player character or the character that left the group when the enemy character catches up with the player character or the character that left the group, and
   returning the character that left the group to the group when a predetermined time has elapsed since the character left the group without the character being attacked by the enemy character.

* * * * *